(12) United States Patent
Mosko

(10) Patent No.: US 9,203,885 B2
(45) Date of Patent: Dec. 1, 2015

(54) METHOD AND APPARATUS FOR EXCHANGING BIDIRECTIONAL STREAMS OVER A CONTENT CENTRIC NETWORK

(71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 31 days.

(21) Appl. No.: 14/263,861

(22) Filed: Apr. 28, 2014

(65) Prior Publication Data

US 2015/0312300 A1  Oct. 29, 2015

(51) Int. Cl.
*H04L 29/06* (2006.01)

(52) U.S. Cl.
CPC ............ *H04L 65/60* (2013.01); *H04L 63/0428* (2013.01); *H04L 63/061* (2013.01); *H04L 63/08* (2013.01); *H04L 63/164* (2013.01); *H04L 69/04* (2013.01)

(58) Field of Classification Search
None
See application file for complete search history.

(56) References Cited

U.S. PATENT DOCUMENTS

| | | | |
|---|---|---|---|
| 4,309,569 A | 1/1982 | Merkle | |
| 4,921,898 A | 5/1990 | Lenney | |
| 5,070,134 A | 12/1991 | Oyamada | |
| 5,110,856 A | 5/1992 | Oyamada | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,233,646 B1 | 5/2001 | Hahm | |
| 6,332,158 B1 | 12/2001 | Risley | |
| 6,574,377 B1 | 6/2003 | Cahill | |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Fall, K. et al., "DTN: an architectural retrospective", Selected areas in communications, IEEE Journal on, vol. 28, No. 5, Jun. 1, 2008, pp. 828-835.

(Continued)

*Primary Examiner* — David Pearson
(74) *Attorney, Agent, or Firm* — Shun Yao; Park, Vaughan, Fleming & Dowler LLP

(57) ABSTRACT

A data-streaming system facilitates establishing a bidirectional data stream over a content centric network (CCN). During operation, the system determines a first routable name prefix associated with a service provider to which the network device desires to establish the bidirectional streaming session. The system also generates a client stream name to provide to the service provider. The client stream name includes a second routable prefix to a local network device, and includes a client stream identifier for a first data stream from the service provider. The system then disseminates an Interest message whose name includes the first routable name prefix and the client stream name. After receiving a Content Object that includes the remote device's response, the system can then communicate with the service provider using a bidirectional stream over the CCN based on the client stream name and the provider stream name.

20 Claims, 11 Drawing Sheets

(56) References Cited

U.S. PATENT DOCUMENTS

| | | |
|---|---|---|
| 6,654,792 B1 | 11/2003 | Verma |
| 6,667,957 B1 | 12/2003 | Corson |
| 6,681,220 B1 | 1/2004 | Kaplan |
| 6,772,333 B1 | 8/2004 | Brendel |
| 6,917,985 B2 | 7/2005 | Madruga |
| 6,981,029 B1 | 12/2005 | Menditto |
| 7,031,308 B2 | 4/2006 | Garcia-Luna-Aceves |
| 7,257,837 B2 | 8/2007 | Xu |
| 7,287,275 B2 | 10/2007 | Moskowitz |
| 7,315,541 B1 | 1/2008 | Housel |
| 7,350,229 B1 | 3/2008 | Lander |
| 7,382,787 B1 | 6/2008 | Barnes |
| 7,444,251 B2 | 10/2008 | Nikovski |
| 7,496,668 B2 | 2/2009 | Hawkinson |
| 7,509,425 B1 | 3/2009 | Rosenberg |
| 7,543,064 B2 | 6/2009 | Juncker |
| 7,552,233 B2 | 6/2009 | Raju |
| 7,555,563 B2 | 6/2009 | Ott |
| 7,567,547 B2 | 7/2009 | Mosko |
| 7,580,971 B1 | 8/2009 | Gollapudi |
| 7,623,535 B2 | 11/2009 | Guichard |
| 7,647,507 B1 | 1/2010 | Feng |
| 7,685,290 B2 | 3/2010 | Satapati |
| 7,698,463 B2 | 4/2010 | Ogier |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 8,000,267 B2 | 8/2011 | Solis |
| 8,010,691 B2 | 8/2011 | Kollmansberger |
| 8,074,289 B1 | 12/2011 | Carpentier |
| 8,160,069 B2 | 4/2012 | Jacobson |
| 8,204,060 B2 | 6/2012 | Jacobson |
| 8,224,985 B2 | 7/2012 | Takeda |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan et al. |
| 8,572,214 B2 | 10/2013 | Garcia-Luna-Aceves |
| 8,665,757 B2 | 3/2014 | Kling |
| 8,667,172 B2 | 3/2014 | Ravindran |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,817,594 B2 | 8/2014 | Gero |
| 8,826,381 B2 | 9/2014 | Kim |
| 2002/0010795 A1 | 1/2002 | Brown |
| 2002/0048269 A1 | 4/2002 | Hong |
| 2002/0078066 A1 | 6/2002 | Robinson |
| 2002/0138551 A1 | 9/2002 | Erickson |
| 2002/0176404 A1 | 11/2002 | Girard |
| 2002/0199014 A1 | 12/2002 | Yang |
| 2003/0046437 A1 | 3/2003 | Eytchison |
| 2003/0051100 A1 | 3/2003 | Patel |
| 2003/0074472 A1 | 4/2003 | Lucco |
| 2004/0024879 A1 | 2/2004 | Dingman |
| 2004/0030602 A1 | 2/2004 | Rosenquist |
| 2004/0139230 A1 | 7/2004 | Kim |
| 2004/0221047 A1 | 11/2004 | Grover |
| 2004/0252683 A1 | 12/2004 | Kennedy |
| 2005/0028156 A1 | 2/2005 | Hammond |
| 2005/0043060 A1 | 2/2005 | Brandenberg |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0051055 A1 | 3/2006 | Ohkawa |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0215684 A1 | 9/2006 | Capone |
| 2006/0223504 A1 | 10/2006 | Ishak |
| 2007/0019619 A1 | 1/2007 | Foster |
| 2007/0073888 A1 | 3/2007 | Madhok |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2008/0005056 A1 | 1/2008 | Stelzig |
| 2008/0010366 A1 | 1/2008 | Duggan |
| 2008/0046340 A1 | 2/2008 | Brown |
| 2008/0101357 A1 | 5/2008 | Iovanna |
| 2008/0123862 A1 | 5/2008 | Rowley |
| 2008/0133755 A1 | 6/2008 | Pollack |
| 2008/0159271 A1 | 7/2008 | Kutt |
| 2008/0186901 A1 | 8/2008 | Itagaki |
| 2008/0215669 A1 | 9/2008 | Gaddy |
| 2008/0270618 A1 | 10/2008 | Rosenberg |
| 2008/0287142 A1 | 11/2008 | Keighran |
| 2008/0288580 A1 | 11/2008 | Wang |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0077184 A1 | 3/2009 | Brewer |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0228593 A1 | 9/2009 | Takeda |
| 2009/0268905 A1 | 10/2009 | Matsushima |
| 2009/0285209 A1* | 11/2009 | Stewart et al. ................. 370/389 |
| 2009/0287835 A1 | 11/2009 | Jacobson |
| 2009/0288163 A1 | 11/2009 | Jacobson |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0046546 A1 | 2/2010 | Ram |
| 2010/0057929 A1 | 3/2010 | Merat |
| 2010/0088370 A1 | 4/2010 | Wu |
| 2010/0098093 A1 | 4/2010 | Ejzak |
| 2010/0103870 A1 | 4/2010 | Garcia-Luna-Aceves |
| 2010/0124191 A1 | 5/2010 | Vos |
| 2010/0131660 A1 | 5/2010 | Dec |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0195654 A1 | 8/2010 | Jacobson |
| 2010/0195655 A1 | 8/2010 | Jacobson |
| 2010/0232402 A1 | 9/2010 | Przybysz |
| 2010/0232439 A1 | 9/2010 | Dham |
| 2010/0235516 A1 | 9/2010 | Nakamura |
| 2010/0250939 A1 | 9/2010 | Adams |
| 2010/0268782 A1 | 10/2010 | Zombek |
| 2010/0284309 A1 | 11/2010 | Allan |
| 2010/0284404 A1 | 11/2010 | Gopinath |
| 2011/0022812 A1 | 1/2011 | vanderLinden |
| 2011/0055392 A1 | 3/2011 | Shen |
| 2011/0090908 A1 | 4/2011 | Jacobson |

(56) References Cited

U.S. PATENT DOCUMENTS

| | | |
|---|---|---|
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Subramanian |
| 2011/0271007 A1 | 11/2011 | Wang |
| 2011/0286457 A1 | 11/2011 | Ee |
| 2011/0286459 A1 | 11/2011 | Rembarz |
| 2011/0299454 A1 | 12/2011 | Krishnaswamy |
| 2012/0011551 A1 | 1/2012 | Levy |
| 2012/0036180 A1 | 2/2012 | Thornton |
| 2012/0066727 A1 | 3/2012 | Nozoe |
| 2012/0114313 A1 | 5/2012 | Phillips |
| 2012/0120803 A1 | 5/2012 | Farkas |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0179653 A1 | 7/2012 | Araki |
| 2012/0221150 A1 | 8/2012 | Arensmeier |
| 2012/0290669 A1 | 11/2012 | Parks |
| 2012/0290919 A1 | 11/2012 | Melnyk |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0219081 A1 | 8/2013 | Qian |
| 2013/0242996 A1 | 9/2013 | Varvello |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1* | 12/2013 | Srinivasan et al. ............ 370/392 |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0082135 A1 | 3/2014 | Jung |
| 2014/0089454 A1 | 3/2014 | Jeon |
| 2014/0129736 A1 | 5/2014 | Yu |
| 2014/0172981 A1 | 6/2014 | Kim |
| 2014/0173034 A1 | 6/2014 | Liu |
| 2014/0195328 A1 | 7/2014 | Ferens |
| 2014/0233575 A1 | 8/2014 | Xie |
| 2014/0237085 A1 | 8/2014 | Park |
| 2014/0280823 A1 | 9/2014 | Varvello |
| 2014/0281505 A1* | 9/2014 | Zhang et al. .................. 713/158 |
| 2014/0282816 A1 | 9/2014 | Xie |
| 2014/0289790 A1 | 9/2014 | Wilson |
| 2015/0006896 A1* | 1/2015 | Franck .......................... 713/171 |
| 2015/0032892 A1* | 1/2015 | Narayanan et al. ........... 709/226 |

FOREIGN PATENT DOCUMENTS

| | | |
|---|---|---|
| EP | 0295727 A2 | 12/1988 |
| EP | 0757065 A2 | 7/1996 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2011049890 A1 | 4/2011 |

OTHER PUBLICATIONS

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking (Feb. 2009).

B. Ahlgren et al., 'A Survey of Information-centric Networking' IEEE Commun. Magazine, Jul. 2012, pp. 26-36.

B. Lynn. The Pairing-Based Cryptography Library, http://crypto.stanford.edu/pbc/.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Mathew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

(56) References Cited

OTHER PUBLICATIONS

Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K, Lin, Y., Tootoonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Symposium (2005).
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias el al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.

(56) References Cited

OTHER PUBLICATIONS

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for con," in Proceedings of the lst International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S.Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Saha!, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Verdi, Joquin Fernandez, and Reid Simmons. "Probabilistic models for monitoring and fault diagnosis." The Second IARP and

(56) References Cited

OTHER PUBLICATIONS

IEEE/RAS Joint Workshop on Technical Challenges for Dependable Robots in Human Environments. Ed. Raja Chatila. Oct. 2002.
Vijay Kumar Adhikari, Yang Guo, Fang Hao, Mateo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing sysetrs," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).

\* cited by examiner

METHOD AND APPARATUS FOR EXCHANGING BIDIRECTIONAL STREAMS OVER A CONTENT CENTRIC NETWORK

BACKGROUND

1. Field

This disclosure is generally related to data-transfer protocols. More specifically, this disclosure is related to transferring data over a bidirectional stream established over a content centric network.

2. Related Art

In a typical content centric network (CCN), devices exchange data by having one device disseminate an Interest that names a piece of data. Routers of the CCN forward this Interest to a content producer that returns a Content Object associated with the Interest's name. The Interest's name can include a set of name components that uniquely identifies the piece of data, and that includes additional attributes of the data (e.g., a version number, a hash value of the data, etc.). Hence, in many cases, the Interest's name needs to be undesirably long to uniquely identify the piece of data. To make matters worse, if the Interest's name is larger than what can be stored in a CCN router's Pending Interest Table (PIT), it is possible that some CCN routers may not forward the Interest, or they may not be able to return the requested data back to the client device that disseminated the Interest.

Another common communication method over CCN includes the Start-Write method, which occurs in CCN repositories, and in the Voice-over CCN (VoCCN) protocol. The Start-Write method provides a way for a client device to send data to a target repository. For example, using the Start-Write method, a client device can disseminate an Interest whose name includes a routable prefix to the target repository, followed by an encoded name for a piece of data hosted by the client device. After receiving the Interest, the target repository disseminates another Interest that includes the name for the piece of data. The client device responds to this Interest with a Content Object that includes the piece of data. Unfortunately, this communication method can result in Interest messages with lengthy names. To make matters worse, while this communication allows communication between two devices, this communication method does not provide a secure communication given that the name of the data being exchanged is exposed by the Interest and Content Object names.

SUMMARY

One embodiment provides a data-streaming system that facilitates establishing a bidirectional data stream over a content centric network (CCN). During operation, a network device determines a first routable name prefix associated with a service provider to which the network device desires to establish the bidirectional streaming session. The network device also generates a client stream name to provide to the service provider. The client stream name includes a second routable prefix to the local network device, and includes a client stream identifier for a first data stream from the service provider. The network device then disseminates an Interest message that includes the first routable name prefix, and includes the client stream name appended to the first routable name prefix. A remote network device associated with the service provider can respond to the Interest by returning a Content Object that includes the remote device's response.

This Content Object's content can include a provider stream name for a remote network device associated with the service provider. The provider stream name includes a second routable prefix to the remote network device and includes a provider stream identifier for a second data stream from the local network device to the service provider. Upon receiving the Content Object that satisfies the Interest message, the local network device can communicate with the service provider using a bidirectional stream over the CCN based on the client stream name and the provider stream name.

In some embodiments, the Interest message can include authentication information for the local network device. Also, the Content Object can include authentication information for the remote network device.

In some embodiments, the network device can obtain a public key of the remote network device during a session-setup process, and encrypts a session key using the remote network device's public key. The network device can also encrypt the client stream name using the session key, and generates the Interest message to include a marshalled data block appended to the first routable name prefix. This marshalled data block can include the encrypted session key, the encrypted client stream name, and the authentication information for the local network device.

In some embodiments, the Content Object's content includes an encrypted session key, which is encrypted using a public key of the local network device. Also, the network device can decrypt the session key using a private key of the local network device, and stores the session key in association with the bidirectional stream.

In some embodiments, while communicating with the remote service provider, the network device can disseminate one or more Interest messages that include the provider stream name associated with the remote network device. For example, a respective Interest message can include an available segment number appended to the provider stream name, so that the available segment number is available to the remote network device for sending a data segment to the local network device. Also, responsive to receiving a Content Object associated with the provider stream name, the network device can process the Content Object's content based on a segment number from the Content Object's name.

In some embodiments, the Content Object's content is encrypted using a session key for the bidirectional stream. Also, while processing the Content Object's contents, the network device can decompress the Content Object's contents using the session key.

In some embodiments, while communicating with the service provider, the network device can receive one or more Interest messages associated with the client stream name. For example, a respective Interest message can include a segment number available to the local network device for sending a data segment to the remote network device. Also, responsive to obtaining data to send to the remote network device, the network device can generate a Content Object with a name from an Interest associated with an available segment number. The Content Object's content can include the data for the remote network device.

In some variations to these embodiments, while generating the Content Object, the network device can obtain a session key for the bidirectional stream, and encrypts the data for the remote network device to produce an encrypted payload. The network device can then generate the Content Object to include the encrypted payload in the Content Object's content.

In some embodiments, the network device can receive, from the remote device, a Content Object that includes a final-block identifier which identifies the Content Object as the final block for the first data stream from the service provider. Also, responsive to detecting the final-block identifier in the Content Object, the network device can close the first data stream from the remote device.

In some embodiments, responsive to determining that the local network device does not have more data to send to the remote network device, the local network device can send a Content Object whose content includes a final-block identifier that identifies the Content Object as the final block for the second data stream to the service provider. The Content Object's name can include a name from an Interest associated with an available segment number.

BRIEF DESCRIPTION OF THE FIGURES

In the figures, like reference numerals refer to the same figure elements.

DETAILED DESCRIPTION

Figure 1:
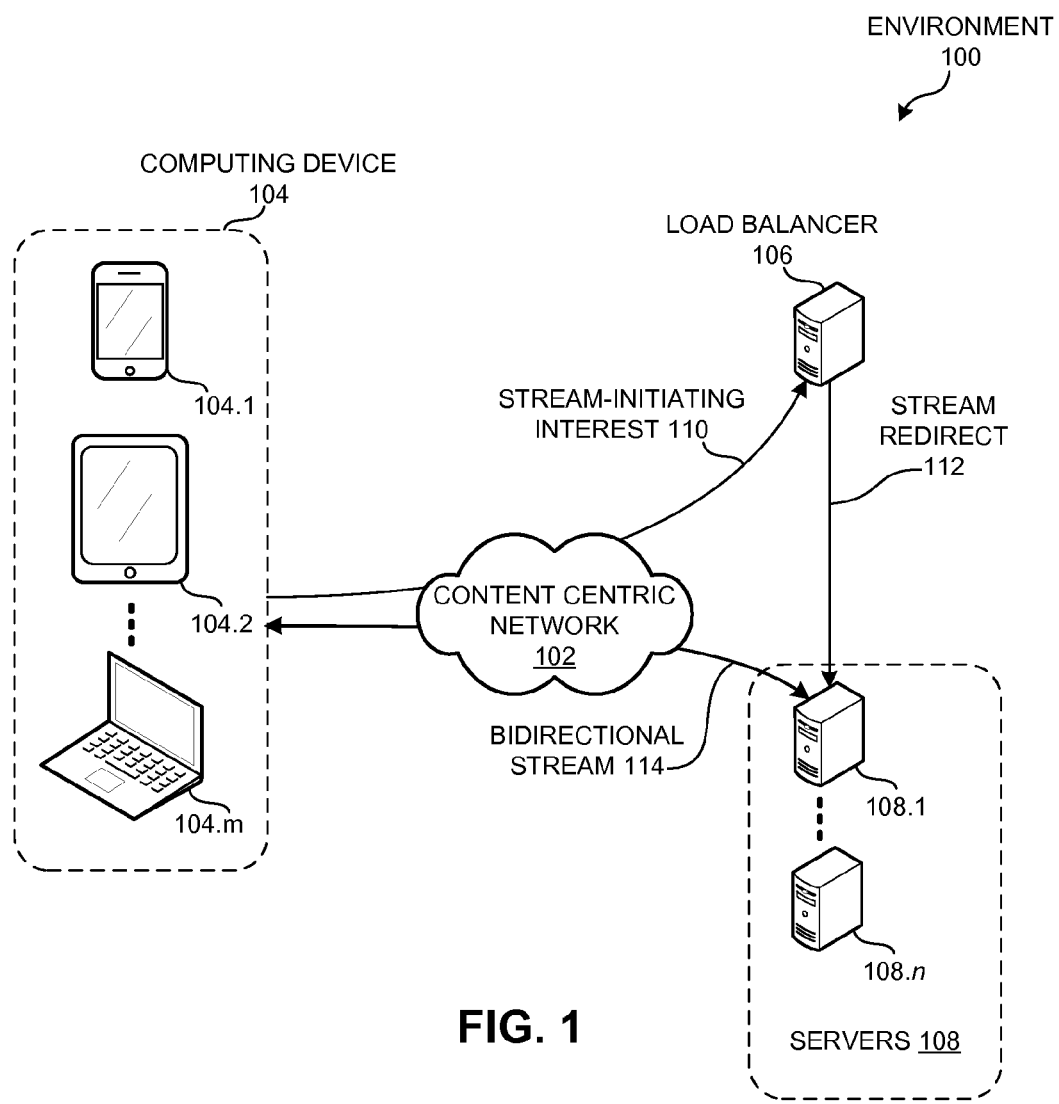
FIG. 1 illustrates an exemplary computing environment that facilitates establishing and maintaining a bidirectional stream over a content centric networkin accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of establishing a bidirectional data stream over a content centric network (CCN). Specifically, two network devices can establish the bidirectional stream by providing to each other a local stream name. For example, a local device can provide a stream name to a target device, and the target device disseminates Interests that include the local device's stream name and a data segment number to establish a reverse path to the target device for these data segments.

Hence, the network devices can transmit data over an established stream by returning Content Objects named based on these data-segment Interests. This allows the Content Object names to be completely decoupled from the data being transmitted over the CCN, which provides data security and reduces name complexity. The Content Object payloads can carry HyperText Transfer Protocol (HTTP) traffic, content centric networking (CCN) messages, or any other type of data. The Content Objects' names are simple, as they include a routable prefix name for the streaming device, a stream identifier or service identifier, and a data segment number. The Content Object's name does not need to identify data being transmitted over the CCN.

The following terms describe elements of a content centric network (CCN) architecture Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Name:

A name in an CCN is typically location independent and uniquely identifies a Content Object. A data-forwarding device can use the name or name prefix to forward an Interest packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, CCN, and test.txt can be structured in a left-oriented prefix-major fashion to form the name "/parc/home/CCN/test.txt." Thus, the name "/parc/home/CCN" can be a "parent" or "prefix" of "/parc/home/CCN/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across a content centric network, which CCN routers can propagate toward a storage device (e.g., a cache server) or a data producer that can provide the requested data to satisfy the request or Interest.

In some embodiments, the CCN system can include a content-centric networking (CCN) architecture. However, the methods disclosed herein are also applicable to other CCN or other information-centric network (ICN) architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

FIG. 1 illustrates an exemplary computing environment 100 that facilitates establishing and maintaining a bidirectional stream over a content centric networkin accordance with an embodiment. Computing environment 100 can include a content centric network 102 (or any information-centric network now known or later developed), which can include a plurality of routing nodes or network nodes that can forward an Interest packet based on the name of the content being requested by the Interest packet, toward a content producer that can satisfy the Interest.

Computing environment 100 can also include a client device 104, which can include any computing device that can disseminate Interests and receive Content Objects via CCN 102. For example, client device 104 can include a smartphone 104.1, a tablet computer 104.2, and/or a personal computing device 104.m (e.g., a laptop). Specifically, client device 104 can establish a bidirectional stream with a remote service by disseminating a stream-initiating Interest that requests establishing the bidirectional stream with a remote network device associated with a given namespace for the service.

In some embodiments, computing environment 100 can include one or more servers 108 that can host data or services for one or more client devices. For example, servers 108 can include a set of servers 108.1-108.n that each can establish and maintain bidirectional streams to one or more client devices over CCN 102. The services can correspond to, for example, a media-streaming service, a Voice-over Content-Centric Network (VoCCN) service, a virtual-private network (VPN) host, a HyperText Transmission Protocol (HTTP) service, a File Transfer Protocol (FTP) service, or any other network service now known or later developed.

In some embodiments, the stream-initiating Interest can propagate across CCN 102 to reach server 108.1. Alternatively, the stream-initiating Interest can propagate to a load balancer 106 for the service, which can select a server (e.g., server 108.1) from servers 108. Server 108.1 can return a Content Object that either accepts (establishes) the bidirectional stream, or rejects the bidirectional stream.

Once the bidirectional streaming session is established between client device 104 and server 108.1, client device 104 and server 108.1 can each disseminate segment-accessing Interest for the bidirectional stream to allow the other device to return Content Objects that include data segments of the stream. For example, the routers and forwarders of CCN 102 can forward the Interest directly from client device 104 to server 108.1, which establishes a direct return path for the data segments being streamed by server 108.1. Also, when server 108.1 receives an Interest or a Content Object for a streaming session with client device 104, server 108.1 can analyze the Interest or Content Object's name to identify which stream it corresponds to.

Figure 2:
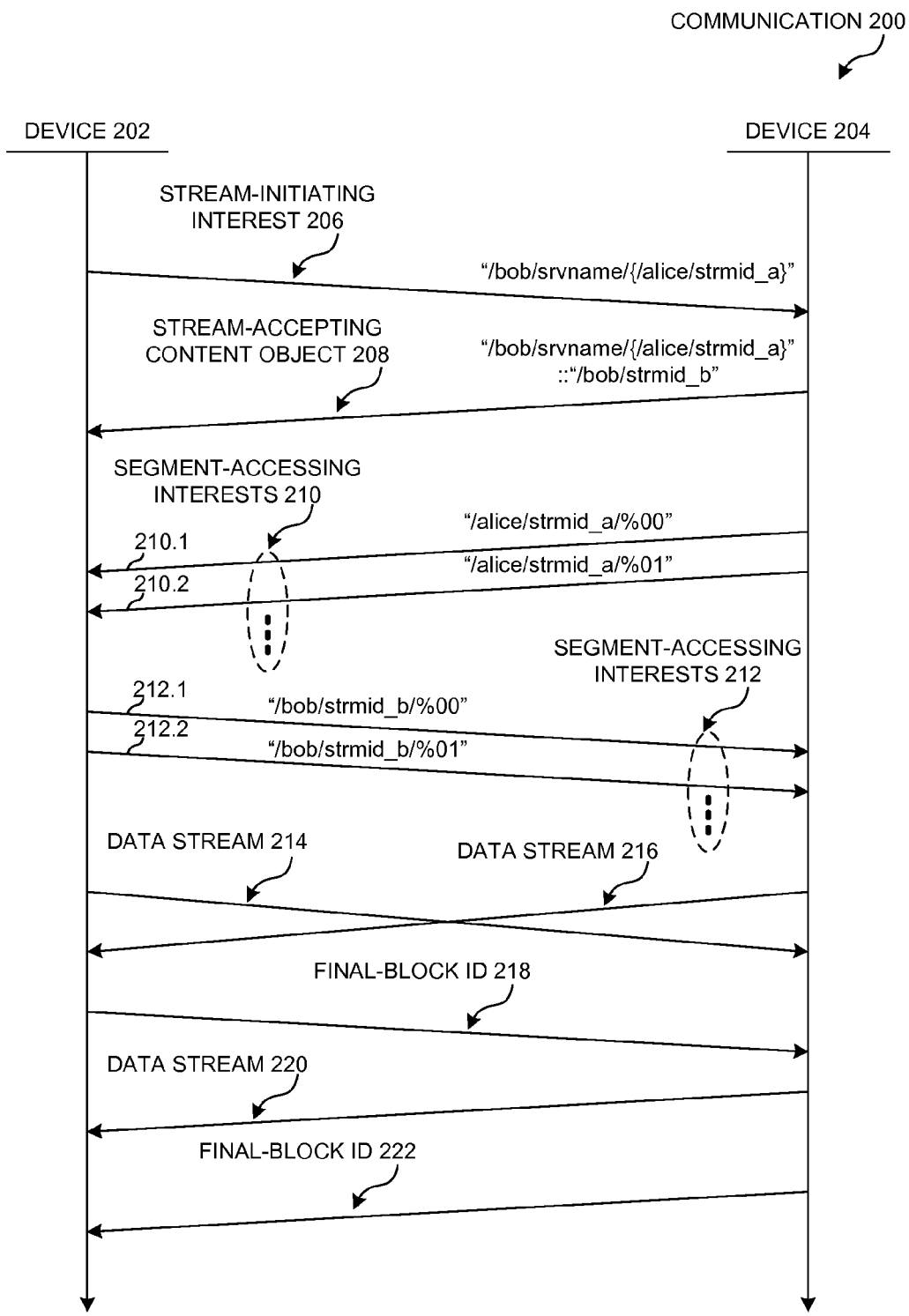
FIG. 2 illustrates exemplary communication between a client device initiating a bidirectional stream with a service provider in accordance with an embodiment.

FIG. 2 illustrates exemplary communication 200 between a client device initiating a bidirectional stream with a service provider in accordance with an embodiment. A network device 202 can request a bidirectional stream from a device 204 by sending a stream-initiating Interest 206 to device 204 over an CCN. Stream-initiating Interest 206 can include a name that has the form:

$$\text{``/bob/srvname/\{/alice/strmid\_a\}''} \quad (1)$$

In name (1), the name prefix "/bob/srvname/" includes a routable name prefix to device 204, and can specify a service at device 204 with which device 202 desires to communicate. The name suffix "{/alice/strmid_a}" can include a stream name for device 202, which can be used by device 204 to send Interest messages to device 202 over the CCN. The stream name's prefix "/alice/" includes a routable prefix to device 202, and the suffix "strmid_a" includes a stream identifier that device 202 has reserved for device 204. In some embodiments, the stream name can be encrypted using a public key from device 204.

If device 204 accepts the request, device 204 returns a stream-accepting Content Object 208 that includes a stream name for device 204. Stream-accepting Content Object 208 can include a content object:

$$\text{``/bob/srvname/\{/alice/strmid\_a\}''::``/bob/strmid\_b''} \quad (2)$$

In Content Object (2), the payload "/bob/strmid_b" includes a stream name for device 204, which can be used by device 202 to send Interest messages to device 204 over the CCN. The stream name's prefix "/bob/" includes a routable prefix to device 204, and the suffix "strmid_b" includes a stream identifier that device 204 has reserved for device 202.

Once the bidirectional stream has been established, device 202 and device 204 can communicate using any protocol on top of the bidirectional streaming session. During this communication, device 204 can send one or more segment-accessing Interests 210 to device 202, which device 202 can respond to by returning Content Objects that include data segments for device 204. Similarly, device 202 can send one or more segment-accessing Interests 212 to device 204, which device 204 can use to return Content Objects carrying data segments for device 202. For example, a segment-accessing Interest 210.1 from device 204 can include the stream name "/alice/strmid_a/" along with a segment number "%00" that identifies a data segment. Device 202 can send a data segment for segment number "%00" over a data stream 214 by generating a Content Object that includes the name from Interest 210.1, and includes the data segment in the Content Object's payload.

In some embodiments, when device 202 (or device 204) receives a Content Object carrying a data segment, device 202 (or device 204) does not need to acknowledge to device 204 (or 202) that the data segment has been received. Rather, if device 204 (or 202) does not receive a Content Object in response to disseminating a segment-accessing Interest, device 204 (or 202) can re-disseminate the segment-accessing Interest specifying the same segment number.

Device 202 can inform device 204 of the final data segment in data stream 214 by including a final-block identifier 218 in a Content Object. Final-block identifier 218 can specify a segment number for the final data segment of data stream 214. Once device 202 sends this final data segment to device 204, both device 202 and device 204 close data stream 214 from device 202. The device that receives Final-block identifier 218 (e.g., device 202) stops sending segment-accessing Interests to the other device that stopped streaming data (e.g., device 204). However, device 202 can proceed to send segment-accessing Interests to device 204, and device 204 can continue to send a data stream 220 to device 202. Hence, unlike other communication protocols (e.g., TCP), device 202 and device 204 do not need to agree on when close the bidirectional streaming session.

Device 204 can inform device 202 of the final data segment in data stream 220 by including a final-block identifier 222 in a Content Object for device 202. For example, device 204 can include final-block identifier 222 in the last Content Object of data stream 220, such that final-block identifier 222 specifies the segment number for this Content Object. Once device 204 sends this final data segment to device 202, both device 202 and device 204 close data stream 222 from device 204.

As mentioned above, device 202 and device 204 can communicate using any communication protocol on top of the bidirectional data stream. For example, device 202 can include a client device that requests a web page over HTTP. Once device 202 receives segment-accessing Interests from device 204, device 202 can return one or more Content Objects that respond to these Interests (e.g., over data stream 214), and carry an HTTP request message for device 204. Device 202 and device 204 then perform the TCP three-way handshake to establish a persistent connection. Device 202 can also use data stream 214 to send Content Objects that include HTTP Get messages to request data over HTTP, and device 204 can use stream 216 to return Content Objects that carry the requested data over HTTP.

Then, when device 202 does not intend on requesting additional data from device 204, device 202 can send a Content Object with Final-Block ID 218. In response, device 204 stops sending device-accessing Interests to device 202. However, device 204 maintains the data stream to device 202 open (illustrated as data stream 220 in FIG. 2), and uses this data stream to continue sending the requested HTTP data to device 202. Once device 204 finishes sending the requested HTTP data, device 204 can generate and return a Content Object that closes the bidirectional stream session by including the equivalent of a TCP "FIN" message in the payload. This Content Object can also include Final-Block ID 222 that specifies the Content Object's segment number to close the data stream to device 202 over the CCN (e.g., closes data stream 220).

Figure 3:
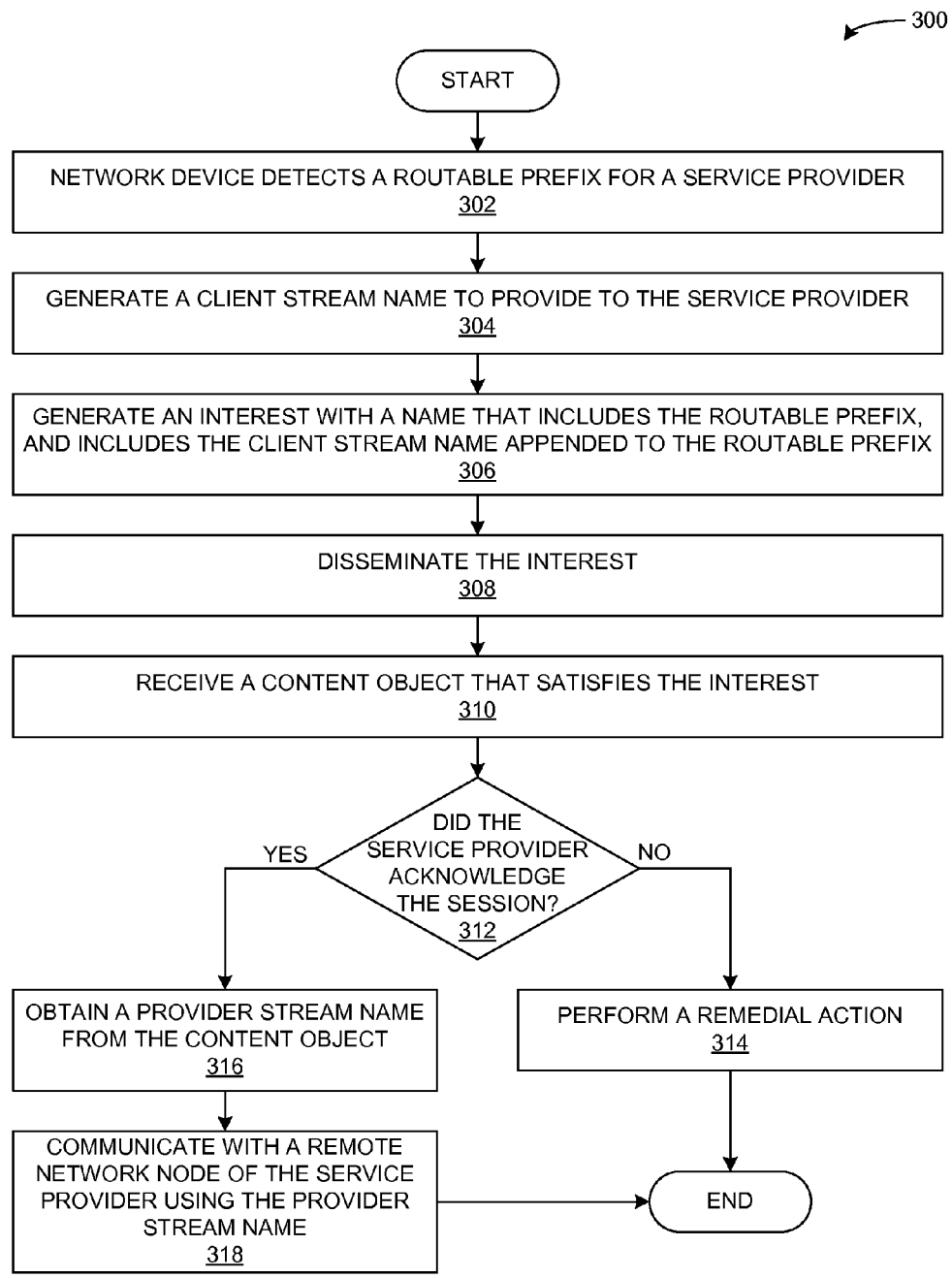
FIG. 3 presents a flow chart illustrating a method for initiating a bidirectional stream with a service provider in accordance with an embodiment.

FIG. 3 presents a flow chart illustrating a method 300 for initiating a bidirectional stream with a service provider in accordance with an embodiment. The service provider can include a server computer that hosts a service, a peer network device that hosts a data-streaming agent, or any other network device that accepts a request for establishing a bidirectional stream. During operation, a network device can detect a routable prefix for the service provider (operation 302), and generates a client stream name to provide to the service provider (operation 304). The client stream name includes an CCN name that a server of the service provider can use to disseminate Interests to the client device.

The client device then generates a stream-initiating Interest to disseminate for the service provider. The stream-initiating Interest's name includes the routable prefix to the service provider, and includes the client stream name appended to the routable prefix (operation 306). In some embodiments, the network device encrypts the client stream name using a public key of the service provider, or using a session key shared with the service provider, and generates the Interest to include the encrypted client stream name. The network device then disseminates the Interest (operation 308), which can propagate to any server computer or network device associated with the service provider.

A server of the service provider can analyze the stream-initiating Interest to determine whether to grant or deny the request to establish a bidirectional stream, and returns a Content Object to respond to the stream-initiating Interest. The local network device can receive the Content Object (operation 310), and analyzes the Content Object to determine whether the service provider has acknowledged the session (operation 312). If the service provider did not acknowledge the session, the network device can perform a remedial action (operation 314), such as to alert the user of the failed attempt to establish the bidirectional stream, or to use a different routable prefix to establish the bidirectional stream.

If the service provider acknowledges the stream session, the local network device can obtain a provider stream name from the Content Object (operation 316). The provider stream name specifies a routable prefix to a target network device of the service provider, and can also specify a name of a service or application running at the network device. The network device can use the provider stream name to communicate with the target network device of the service provider (operation 318).

In some embodiments, the local network device can allow the target network device to send data to the local network device over a content centric network by disseminating one or more Interest messages for the target network device. Each Interest message corresponds to a data segment, which the target network device can use to return a Content Object that includes that data segment for the local network device.

Figure 4:
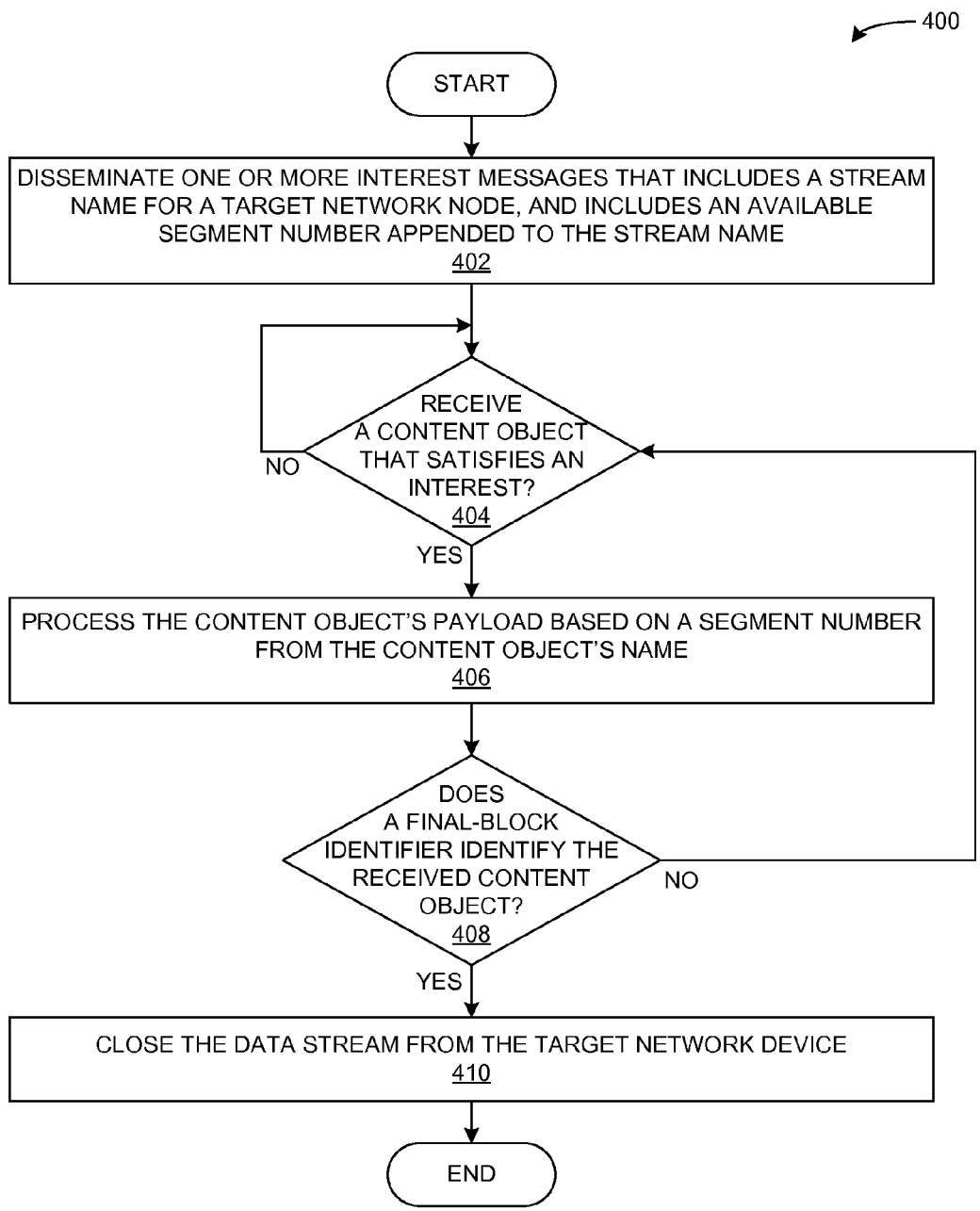
FIG. 4 presents a flow chart illustrating a method for maintaining a data stream from a remote network device in accordance with an embodiment.

FIG. 4 presents a flow chart illustrating a method 400 for maintaining a data stream from a target network device in accordance with an embodiment. During operation, the local network device can disseminate one or more Interest messages that each includes a stream name for the target network device, and includes an available segment number appended to the stream name (operation 402). In some embodiments, the network device can use a congestion control algorithm (e.g., TCP Vegas, TCP Reno, etc.) to determine a number of outstanding Interests to disseminate (open) for the stream. Also, the network device can disseminate Interests of increasing segment numbers.

The network device then determines whether it has received a Content Object that satisfies an Interest message for an available segment number (operation 404). If the network device has received a Content Object, the network device processes the Content Object's payload based on a segment number from the Content Object's name (operation 406). For example, the network device can combine data segments from multiple Content Objects to form a piece of data, such that the data segments are ordered based on their segment numbers.

Recall that a Content Object can include a Final-Block Identifier, which specifies a segment number for the final Content Object of the target network device's data stream. For example, a Content Object's Final-Block Identifier can specify a segment number of that Content Object if the its payload includes the last data segment of the stream. On the other hand, if the data stream has a fixed length, an earlier Content Object of the stream can include a Final-Block Identifier that specifies a segment number for a later Content Object. When the network device receives a Content Object that includes a Final-Block Identifier, the network device can use the Final-Block Identifier to detect the end of the incoming data stream.

Hence, after receiving the Content Object, the network device determines whether it has obtained a Final-Block Identifier that identifies the Content Object's segment number (operation 408). If a Final-Block Identifier does not identify the Content Object, the network device can return to operation 404 to receive more Content Objects for one or more available segment numbers. In some embodiments, the network device's congestion control algorithm can determine whether to disseminate additional Interests for the stream. If more Interests need to be disseminated, the network device can return to operation 402 to disseminate additional Interests.

Otherwise, if a Final-Block Identifier does identify the Content Object, the network device can close the data stream from the target device (operation 410). In some embodiments, the local network device may still send data to the target device over the stream, even though the local device has closed the receiving stream from the target device.

Figure 5:
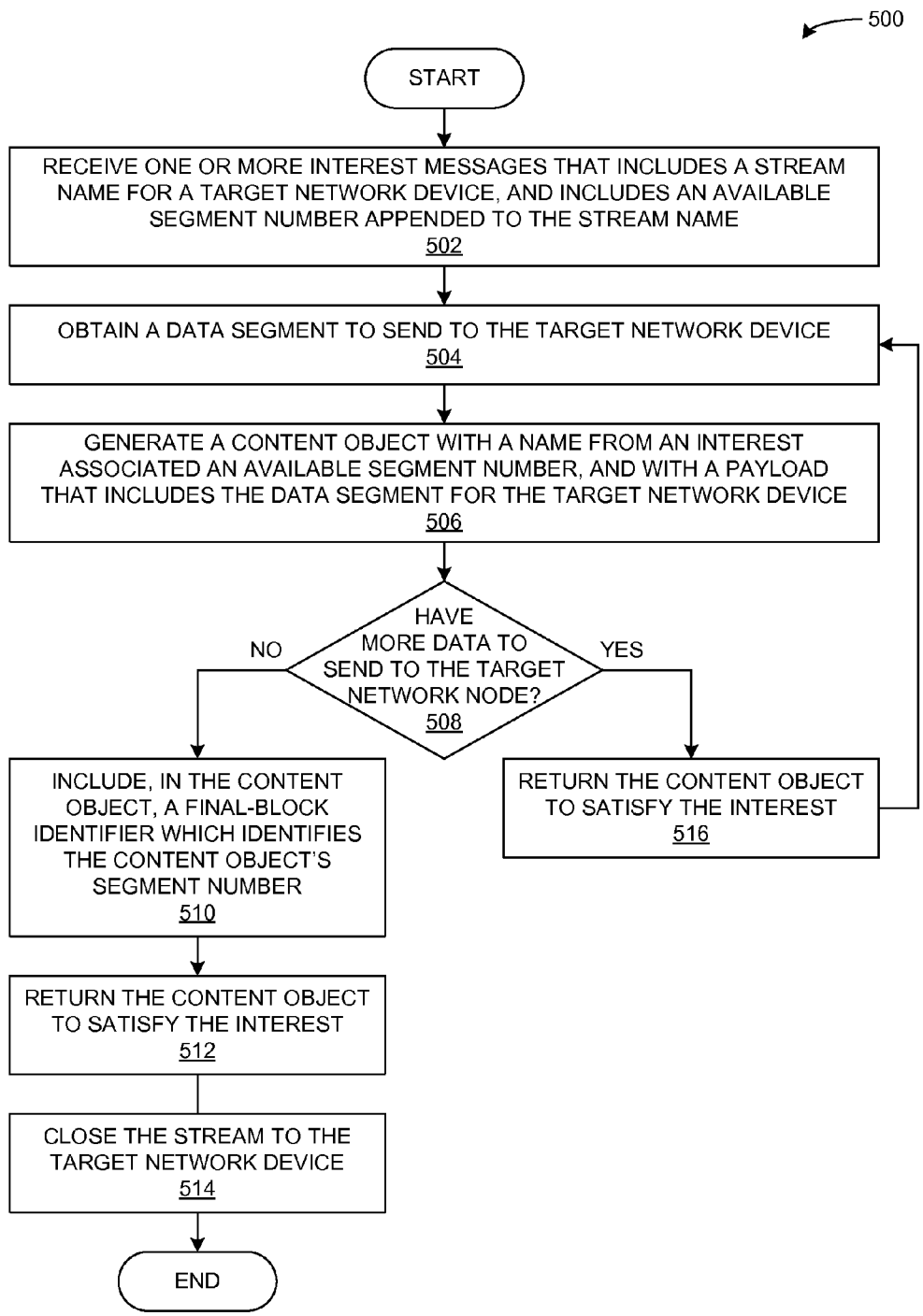
FIG. 5 presents a flow chart illustrating a method for maintaining a data stream to a remote network device in accordance with an embodiment.

FIG. 5 presents a flow chart illustrating a method 500 for maintaining a data stream to a target network device in accordance with an embodiment. During operation, the network device can receive one or more Interest messages that each includes a stream name for a target network device, and includes an available segment number appended to the stream name (operation 502). Each of these Interest messages establishes a path between the target device and the local device over a content centric network for a data segment. As CCN routers forward an Interest toward the local network device, these CCN routers create an entry in a Pending Interest Table (PIT) for the Interest. This PIT entry maps the Interest's name to an interface from which the Interest arrived. This way, as a Content Object with the same name is returned through this path, the CCN routers can perform a lookup operation on the PIT to determine which interface to use to return the Content Object toward the target network device.

In some embodiments, when the local network device obtains a data segment to send to the target network device (operation 504), the local network device generates a Content Object to send the data segment to the target device (operation 506). This Content Object includes a name from an Interest associated with an available segment number, and includes the data segment as the Content Object's payload. When generating the Content Object, the local device can also determine whether there exists more data to send to the target network device (operation 508). If so, the network device can return the Content Object over the CCN to send the data segment using a path established by an Interest message (operation 516), and returns to operation 504 to obtain more data segments for the target device.

On the other hand, if the local network device does not have more data segments to send to the target device, the local device can generate the Content Object to include a Final-Block Identifier that specifies this Content Object's segment number (operation 510). Including this Final-Block Identifier in the Content Object informs the target device of the end of the data stream. The local network device then returns the Content Object over the CCN (operation 512), and closes the data stream to the target network device (operation 514). In some embodiments, the local network device may still receive data from the target device over the stream, even though the local device has closed the stream to the target device.

Authentication

Figure 6:
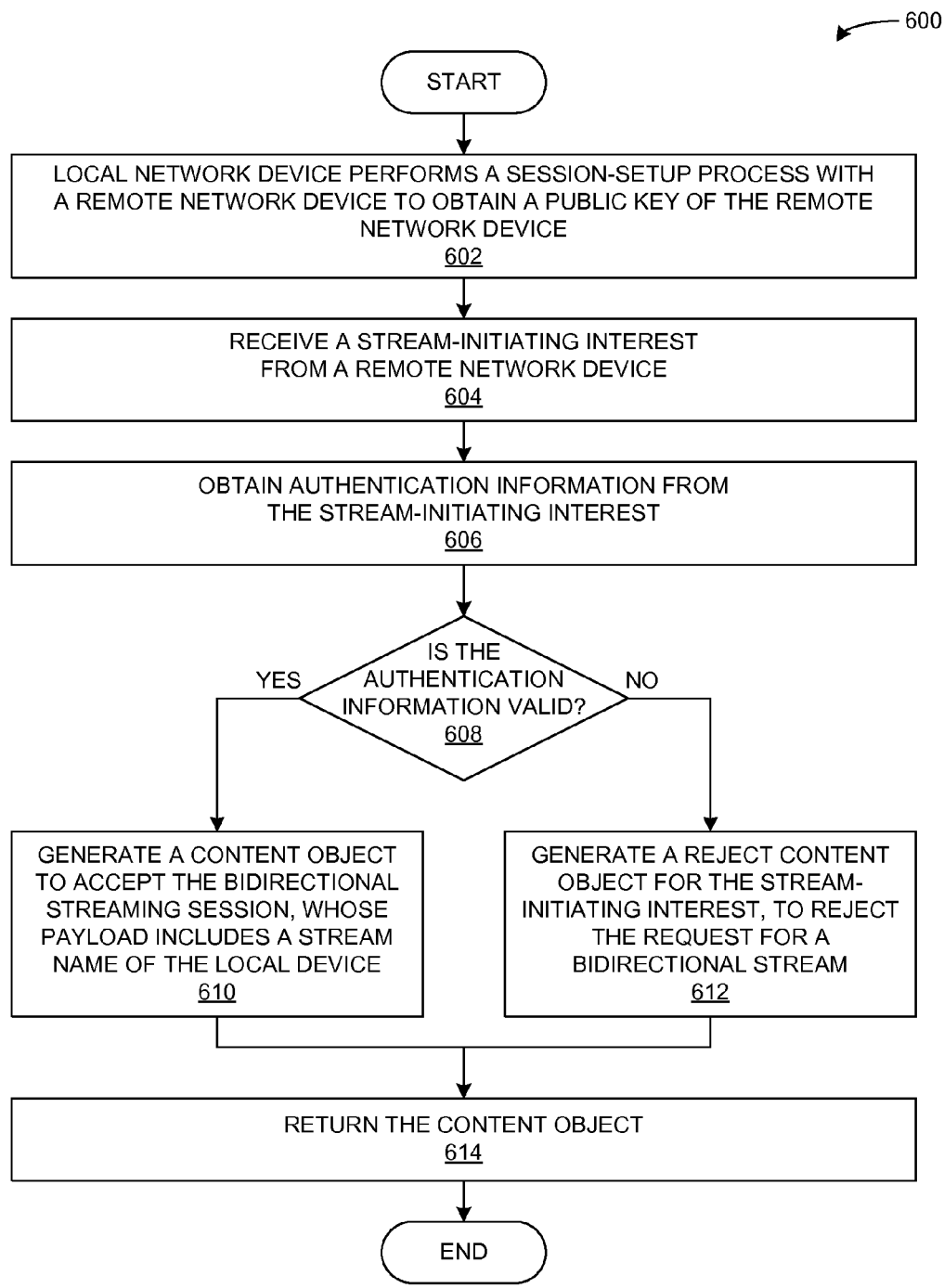
FIG. 6 presents a flow chart illustrating a method for authenticating a remote network device requesting to initiate a bidirectional stream in accordance with an embodiment.

FIG. 6 presents a flow chart illustrating a method 600 for authenticating a remote network device requesting to initiate a bidirectional stream in accordance with an embodiment. During operation, the local network device can perform a session-setup process with the remote device to obtain a public key of the remote device (operation 602). For example, the local network device and the remote network device can establish a secure session, as described in U.S. patent application Ser. No. 14/174,681 (entitled "CONTENT-BASED TRANSPORT SECURITY," by inventors Marc E. Mosko and Ersin Uzun, filed 6 Feb. 2014), which is hereby incorporated by reference.

The device can receive a stream-initiating Interest from the remote device (operation 604), and determines whether to initiate the bidirectional stream with the remote device. In doing so, the local device can obtain authentication information from the stream-initiating Interest (operation 606), and determines whether the authorization information is valid (operation 608). For example, the local device can obtain any cryptographic information that can securely prove the identity of the remote device, such as a digital certificate or a public key from the remote device.

If the authentication information is valid, the network device can generate a Content Object to accept the bidirectional stream (operation 610), and returns the Content Object over the CCN (operation 614). The Content Object's name includes the name of the stream-initiating Interest, and the payload includes a stream name of the local network device. The remote device can use this stream name to disseminate a sequence of Interests that establish a path over an CCN to the local device for various data segments.

Otherwise, if the authentication information is not valid, the network device can generate a reject Content Object for the stream-initiating Interest (operation 612), and returns the Content Object over the CCN (operation 614). This reject Content Object rejects the remote device's request for a bidirectional stream.

Figure 7A:
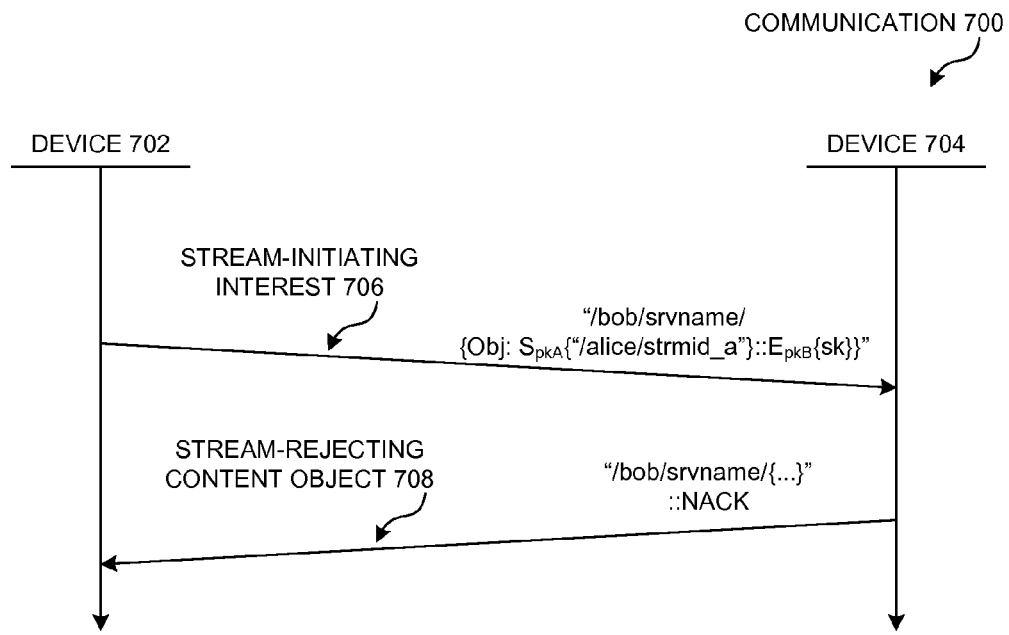
FIG. 7A illustrates exemplary communication to a target network device that rejects a request to establish a bidirectional stream in accordance with an embodiment.

FIG. 7A illustrates exemplary communication 700 to a target network device that rejects a request to establish a bidirectional stream in accordance with an embodiment. A network device 702 can request a bidirectional stream from a device 704 by sending an encrypted stream-initiating Interest 706 to device 704 over an CCN. Stream-initiating Interest 706 can include a name that has the form:

$$\text{``/bob/srvname/}\{Obj:S_{pkA}\{\text{``/alice/strmid\_a''}\}:: E_{pkB}\{sk\}\}\text{''} \quad (3)$$

In name (3), the name prefix "/bob/srvname/" includes a routable name prefix to device 704. The name suffix includes a Content Object whose name includes a stream name for device 702 "/alice/strmid_a," which is signed using a public key from device 702. This stream name can be used by device 204 to send Interest messages to device 702 over the CCN. The Content Object's payload includes a shared key "sk," which has been encrypted using a public key from device 704.

In some embodiments, the Content Object in the stream-initiating Interest's name suffix can include the stream name for device 702 in the Content Object's payload. For example, this Content Object can include the shared key which has been encrypted using a public key from device 704, and can also include the stream name "/alice/strmid_a" encrypted using the shared key. Device 704 can decrypt the shared key using its private key, and can use the shared key to decrypt the stream name for device 702.

Device 704 can apply a trust model to determine whether device 702 is a valid user, and is authorized to use the "/alice/" namespace. If device 704 does not trust the information provided by device 702, device 704 can return a stream-rejecting Content Object 708 along a reverse path for Interest 706 to reject the stream request from device 702. Stream-rejecting Content Object 708 includes the name from stream-initiating Interest 706, and includes a payload that carries a negative acknowledgement message (NACK) that rejects the stream request from device 702.

Figure 7B:
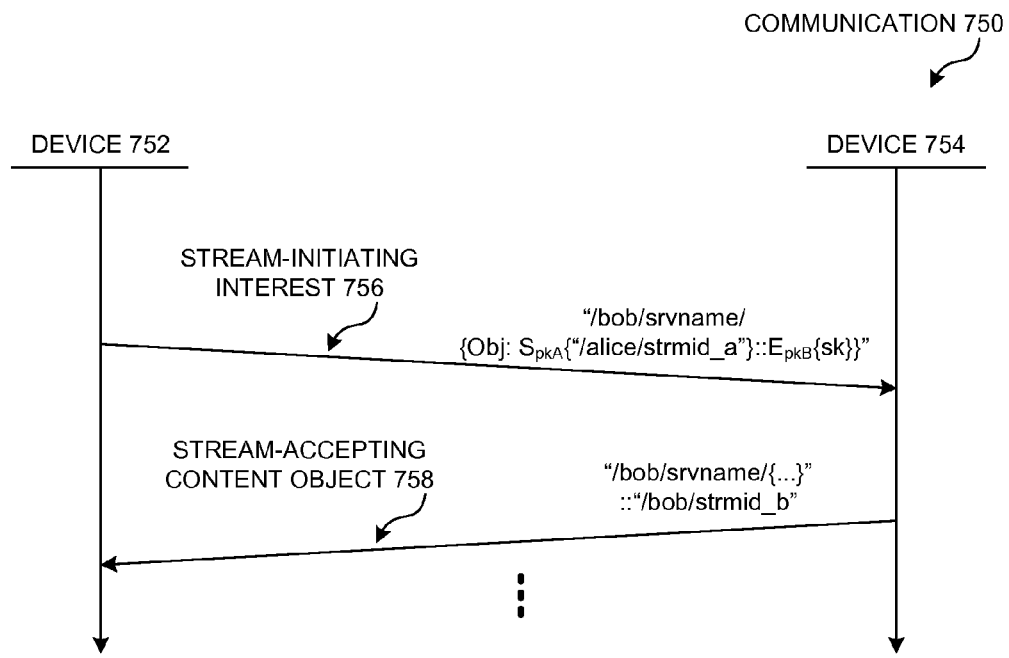
FIG. 7B illustrates exemplary communication to a target network device that accepts a request to establish a bidirectional stream in accordance with an embodiment.

FIG. 7B illustrates exemplary communication 750 to a target network device that accepts a request to establish a bidirectional stream in accordance with an embodiment. A network device 752 can request a bidirectional stream from a device 754 by sending an encrypted stream-initiating Interest 756 to device 754 over an CCN. Device 754 can apply a trust model to determine whether device 752 is a valid user, and is authorized to use the "/alice/" namespace.

If device 754 accepts the request, device 754 returns a stream-accepting Content Object 758 that includes a stream name for device 754. Stream-accepting Content Object 758 can include a content object:

$$\text{"/bob/srvname/}\{Obj:S_{pkA}\{\text{"/alice/strmid\_a"}\}::\text{"/bob/strmid\_b"} \quad (4)$$

In Content Object (4), the name matches that of stream-initiating Interest 756, and the payload "/bob/strmid_b" includes a stream name for device 754. This stream name can be used by device 752 to send Interest messages to device 754 over the CCN.

Once the bidirectional streaming session is established, device 752 and device 754 can proceed to communicate over the bidirectional stream. Since the names used in the segment-accessing Interests do not reveal anything about the content being exchanged, device 752 and 754 do not need to encrypt these Interest names. However, device 752 and 754 can protect the Content Objects by encrypting their payload using the session key.

Redirection

Figure 8:
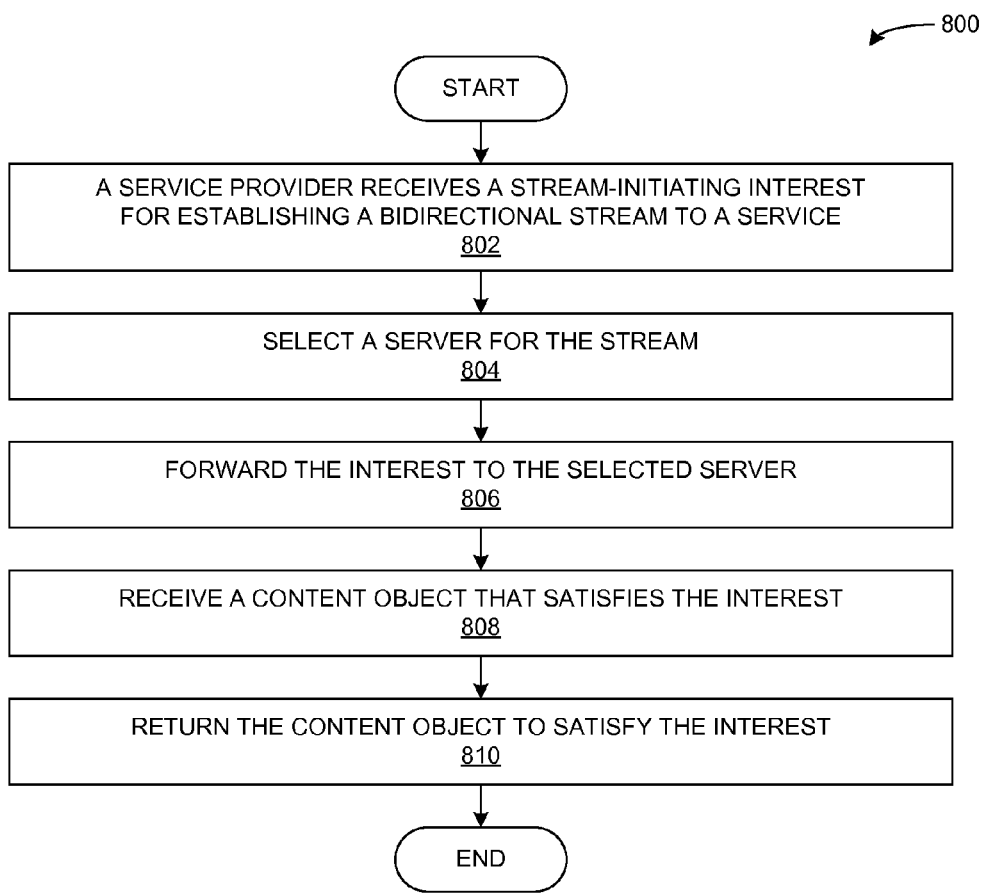
FIG. 8 presents a flow chart illustrating a method for redirecting a stream-initiating Interest in accordance with an embodiment.

FIG. 8 presents a flow chart illustrating a method 800 for redirecting a stream-initiating Interest in accordance with an embodiment. During operation, a service provider can receive a stream-initiating Interest for establishing a bidirectional stream to a service (operation 802). If the service provider acknowledges the stream session, the service provider can select a server for the stream (operation 804), such as to perform load balancing across a set of servers. The service provider then forwards the Interest to the selected server (operation 806).

The selected server can then process the stream-initiating Interest to establish a bidirectional stream as usual, and returns a Content Object that specifies a stream name for the selected server. This Content Object traverses along a path established by the stream-initiating Interest, which includes the service provider. Hence, when the service provider receives the Content Object (operation 808), the service provider returns the Content Object over the CCN to satisfy the Interest (operation 810).

Figure 9:
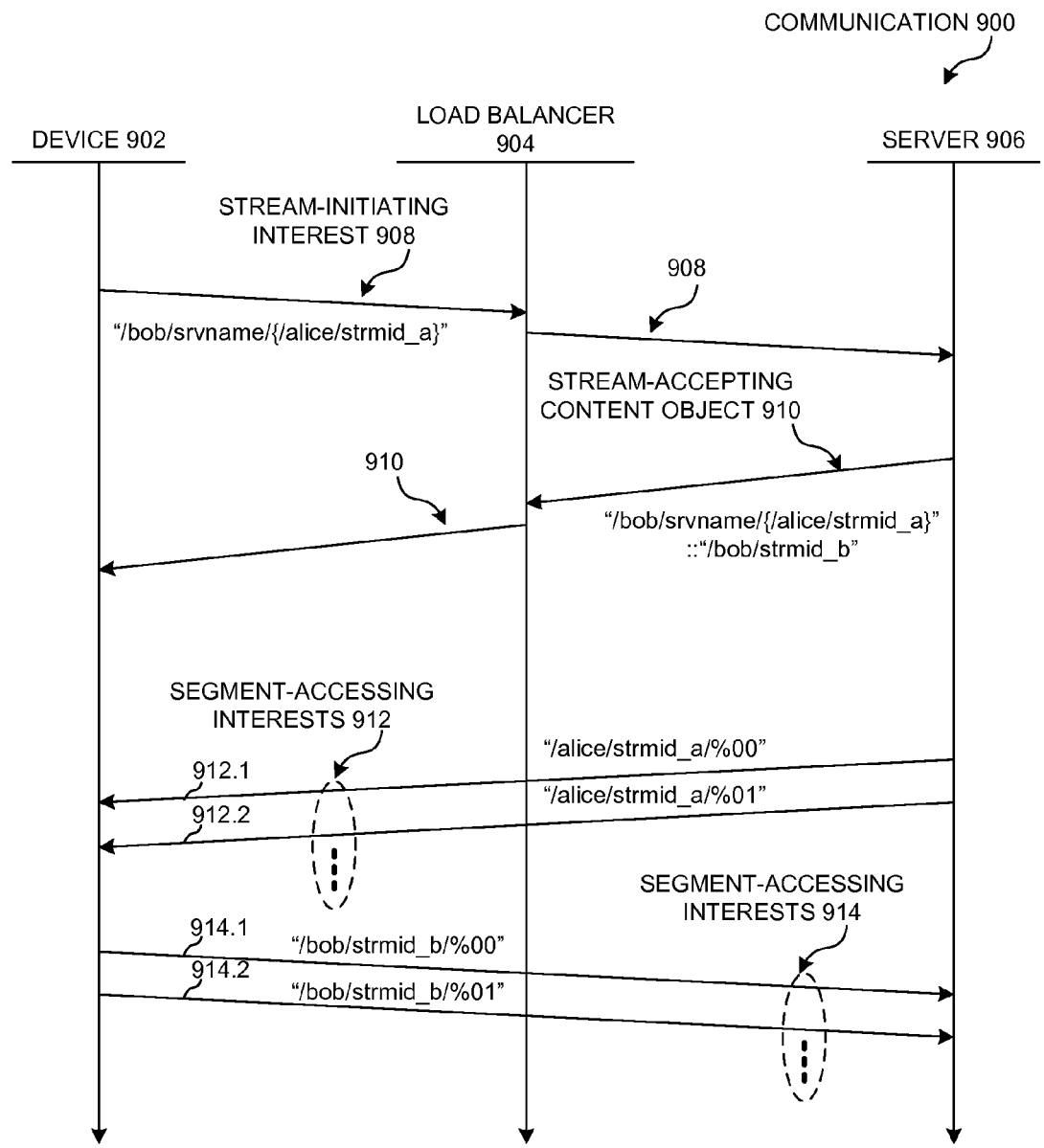
FIG. 9 illustrates exemplary communication to a load balancer that redirects a stream-initiating Interest in accordance with an embodiment.

FIG. 9 illustrates exemplary communication 900 to a load balancer 904 that redirects a stream-initiating Interest in accordance with an embodiment. A device 902 can disseminate a stream-initiating Interest 908 to the name prefix "/bob/srvname" to request initiating a data stream to a desired service. This name prefix may map to load balancer 904, which causes routers and forwarders along an CCN to forward Interest 908 to load balancer 904. Load balancer 904 may select a server 906 to handle the bidirectional stream, and forwards stream-initiating Interest 908 to server 906.

Server 906 processes stream-initiating Interest 908 as usual. If server 906 accepts the streaming session, server 906 can return a stream-accepting Content Object 910 that includes a stream name for server 906. Once device 902 receives stream-accepting Content Object 910, device 902 and server 906 can communicate with each other directly over a bidirectional data stream. For example, server 906 can disseminate segment accessing Interests 912, which are forwarded over an CCN directly to device 902. This allows device 902 to stream data segments to server 906 over a direct path established by Interests 912. Similarly, device 902 can disseminate segment accessing Interests 914, which are forwarded over the CCN directly to server 906. Server 906 can return Content Objects that stream data segments to device 902 over a direct path established by Interests 914.

Figure 10:
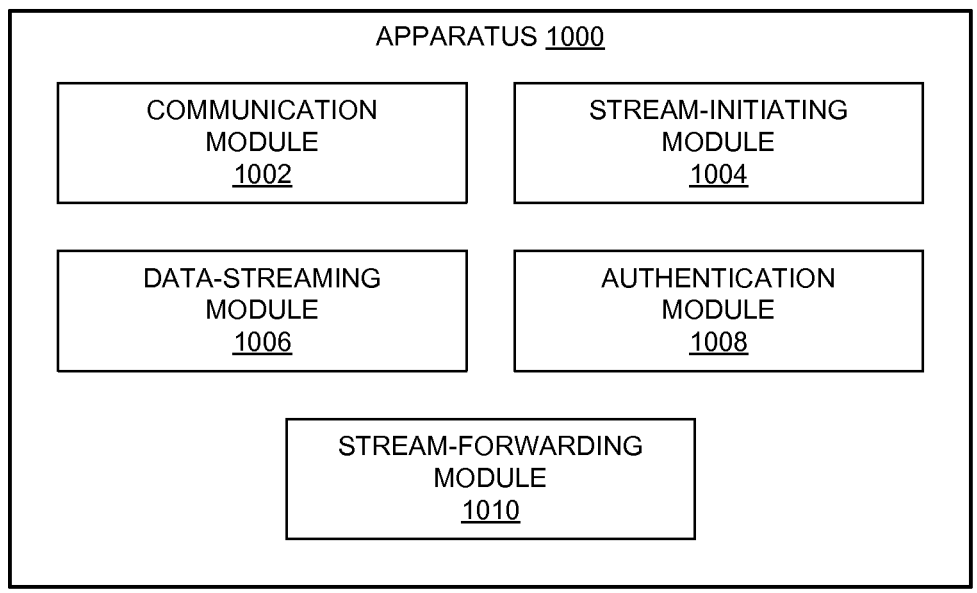
FIG. 10 illustrates an exemplary apparatus that facilitates establishing and maintaining a bidirectional stream over a content centric networkin accordance with an embodiment.

FIG. 10 illustrates an exemplary apparatus 1000 that facilitates establishing and maintaining a bidirectional stream over a content centric networkin accordance with an embodiment. Apparatus 1000 can comprise a plurality of modules which may communicate with one another via a wired or wireless communication channel. Apparatus 1000 may be realized using one or more integrated circuits, and may include fewer or more modules than those shown in FIG. 10. Further, apparatus 1000 may be integrated in a computer system, or realized as a separate device which is capable of communicating with other computer systems and/or devices. Specifically, apparatus 1000 can comprise a communication module 1002, a stream-initiating module 1004, a data-streaming module 1006, an authentication module 1008, and a stream-forwarding module 1010.

In some embodiments, communication module 1002 can disseminate Interests and/or receive Content Objects over a content centric network. Stream-initiating module 1004 can disseminate an Interest message that includes a routable name prefix to a service provider and a client stream name for the local network device, and can receive a Content Object that includes a provider stream name for a remote network device associated the service provider. Data-streaming module 1006 can communicate with the service provider using a bidirectional stream over the CCN based on the client stream name and the provider stream name.

Authentication module 1008 can analyze authentication information from Interest messages and Content Objects received from the service provider to authenticate the service provider. Stream-forwarding module 1010 can perform load balancing by forwarding a stream-initiating Interest to one or more servers in a cluster.

Figure 11:
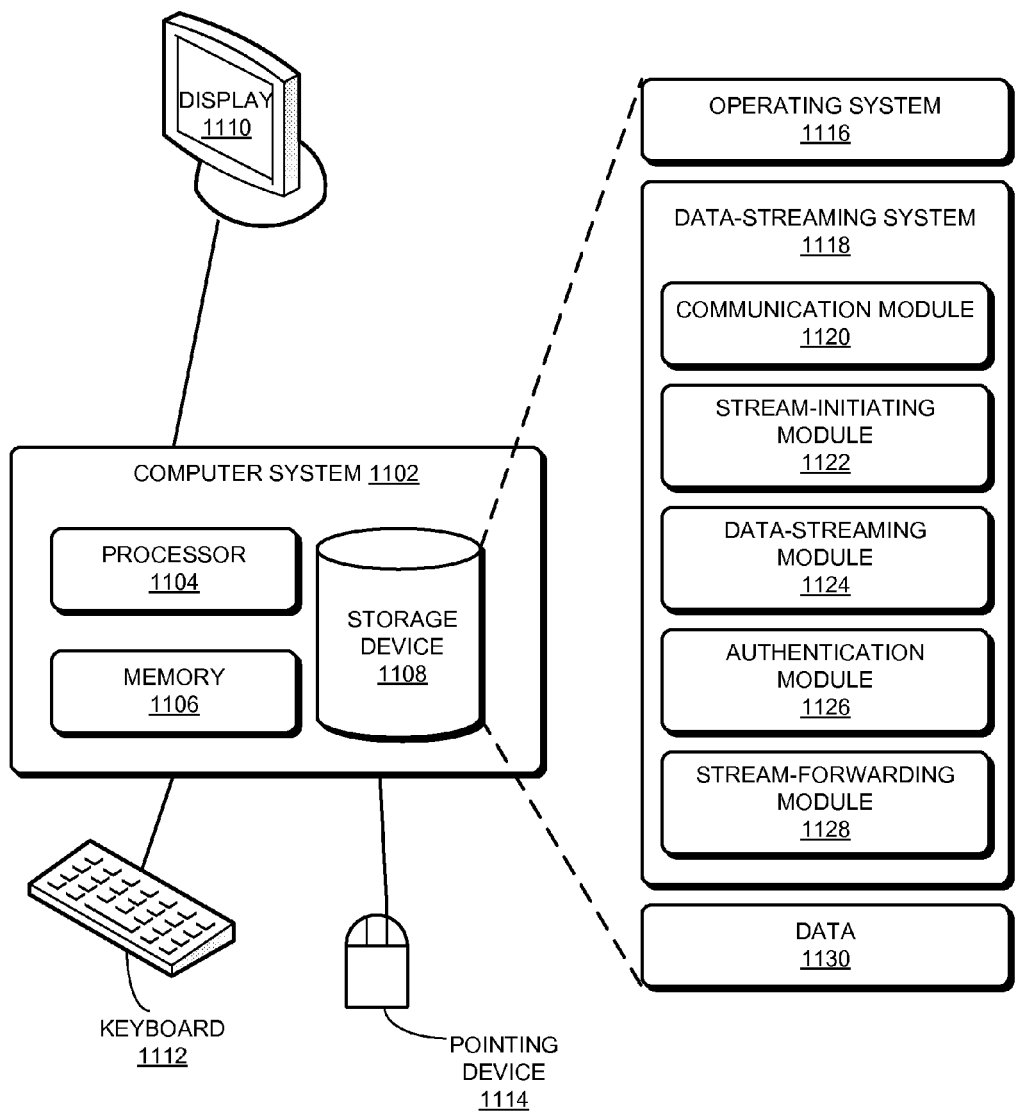
FIG. 11 illustrates an exemplary computer system that facilitates establishing and maintaining a bidirectional stream over a content centric networkin accordance with an embodiment.

FIG. 11 illustrates an exemplary computer system 1102 that facilitates establishing and maintaining a bidirectional stream over a content centric networkin accordance with an embodiment. Computer system 1102 includes a processor 1104, a memory 1106, and a storage device 1108. Memory 1106 can include a volatile memory (e.g., RAM) that serves as a managed memory, and can be used to store one or more memory pools. Furthermore, computer system 1102 can be coupled to a display device 1110, a keyboard 1112, and a pointing device 1114. Storage device 1108 can store operating system 1116, data-streaming system 1118, and data 1130.

Data-streaming system 1118 can include instructions, which when executed by computer system 1102, can cause computer system 1102 to perform methods and/or processes described in this disclosure. Specifically, data-streaming system 1118 may include instructions for disseminating Interests and/or receive Content Objects over a content centric network (communication module 1120). Further, data-streaming system 1118 can include instructions for disseminating an Interest message that includes a routable name prefix to a service provider and a client stream name for the local network device, and can for receiving a Content Object that includes a provider stream name for a remote network device associated the service provider (stream-initiating module 1122). Data-streaming system 1118 can also include instructions for communicating with the service provider using a bidirectional stream over the CCN based on the client stream name and the provider stream name (data-streaming module 1124).

Data-streaming system 1118 can include instructions for analyzing authentication information from Interest messages and Content Objects received from the service provider to authenticate the service provider (authentication module 1126). Data-streaming system 1118 can also include instructions for performing load balancing by forwarding a stream-initiating Interest to one or more servers in a cluster (stream-forwarding module 1128).

Data 1130 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for establishing a bidirectional stream over a content centric network (CCN), the method comprising:
    determining, by a local network device, a first routable name prefix associated with a service provider;
    generating a client stream name to provide to the service provider, wherein the client stream name includes a second routable prefix to the local network device, and includes a client stream identifier for a first data stream from the service provider;
    disseminating an Interest message that includes the first routable name prefix, and includes the client stream name appended to the first routable name prefix;
    receiving a Content Object that satisfies the Interest message, wherein the Content Object's content includes a provider stream name for a remote network device associated with the service provider, and wherein the provider stream name includes a second routable prefix to the remote network device and includes a provider stream identifier for a second data stream from the local network device to the service provider; and
    communicating with the service provider using a bidirectional stream over the CCN based on the client stream name and the provider stream name.

2. The method of claim 1, wherein the Interest message includes authentication information for the local network device; and
    wherein the Content Object includes authentication information for the remote network device.

3. The method of claim 2, further comprising:
    obtaining a public key of the remote network device during a session-setup process;
    encrypting a session key using the remote network device's public key;
    encrypting the client stream name using the session key; and
    generating the Interest message to include a marshalled data block appended to the first routable name prefix, wherein the marshalled data block includes the encrypted session key, the encrypted client stream name, and the authentication information for the local network device.

4. The method of claim 2, wherein the Content Object's content includes an encrypted session key, which is encrypted using a public key of the local network device, and wherein the method further comprises:
    decrypting the session key using a private key of the local network device; and
    storing the session key in association with the bidirectional stream.

5. The method of claim 1, wherein communicating with the remote service provider involves:
    disseminating one or more Interest messages that include the provider stream name associated with the remote network device, wherein a respective Interest message includes an available segment number appended to the provider stream name, and wherein the available segment number is available to the remote network device for sending a data segment to the local network device; and
    responsive to receiving a Content Object associated with the provider stream name, processing the Content Object's content based on a segment number from the Content Object's name.

6. The method of claim 5, wherein the Content Object's content is encrypted using a session key for the bidirectional stream; and
    wherein processing the Content Object's contents involves decompressing the Content Object's contents using the session key.

7. The method of claim 1, wherein communicating with the service provider involves:
    receiving one or more Interest messages associated with the client stream name, wherein a respective Interest message includes a segment number available to the local network device for sending a data segment to the remote network device; and
    responsive to obtaining data to send to the remote network device, generating a Content Object with a name from an Interest associated with an available segment number, wherein the Content Object's content includes the data for the remote network device.

8. The method of claim 7, wherein generating the Content Object involves:
    obtaining a session key for the bidirectional stream;

encrypting the data for the remote network device to produce an encrypted payload; and generating the Content Object to include the encrypted payload in the Content Object's content.

9. The method of claim 1, further comprising:

receiving, from the remote network device, a Content Object that includes a final-block identifier which identifies the Content Object as the final block for the first data stream from the service provider; and responsive to detecting the final-block identifier in the Content Object, closing the first data stream from the remote network device.

10. The method of claim 1, further comprising:

responsive to determining that the local network device does not have more data to send to the remote network device, sending a Content Object with a name from an Interest associated with an available segment number, wherein the Content Object's content includes a final-block identifier that identifies the Content Object as the final block for the second data stream to the service provider.

11. A non-transitory computer-readable storage medium storing instructions that when executed by a computer cause the computer to perform a method for establishing a bidirectional stream over a content centric network (CCN), the method comprising:

determining, by a local network device, a first routable name prefix associated with a service provider;

generating a client stream name to provide to the service provider, wherein the client stream name includes a second routable prefix to the local network device, and includes a client stream identifier for a first data stream from the service provider;

disseminating an Interest message that includes the first routable name prefix, and includes the client stream name appended to the first routable name prefix;

receiving a Content Object that satisfies the Interest message, wherein the Content Object's content includes a provider stream name for a remote network device associated with the service provider, and wherein the provider stream name includes a second routable prefix to the remote network device and includes a provider stream identifier for a second data stream from the local network device to the service provider; and communicating with the service provider using a bidirectional stream over the CCN based on the client stream name and the provider stream name.

12. The storage medium of claim 11, wherein the Interest message includes authentication information for the local network device; and wherein the Content Object includes authentication information for the remote network device.

13. The storage medium of claim 12, wherein the method further comprises:

obtaining a public key of the remote network device during a session-setup process;

encrypting a session key using the remote network device's public key;

encrypting the client stream name using the session key; and generating the Interest message to include a marshalled data block appended to the first routable name prefix, wherein the marshalled data block includes the encrypted session key, the encrypted client stream name, and the authentication information for the local network device.

14. The storage medium of claim 12, wherein the Content Object's content includes an encrypted session key, which is encrypted using a public key of the local network device, and wherein the method further comprises:

decrypting the session key using a private key of the local network device; and storing the session key in association with the bidirectional stream.

15. The storage medium of claim 11, wherein communicating with the remote service provider involves:

disseminating one or more Interest messages that include the provider stream name associated with the remote network device, wherein a respective Interest message includes an available segment number appended to the provider stream name, and wherein the available segment number is available to the remote network device for sending a data segment to the local network device; and responsive to receiving a Content Object associated with the provider stream name, processing the Content Object's content based on a segment number from the Content Object's name.

16. The storage medium of claim 15, wherein the Content Object's content is encrypted using a session key for the bidirectional stream; and wherein processing the Content Object's contents involves decompressing the Content Object's contents using the session key.

17. The storage medium of claim 11, wherein communicating with the service provider involves:

receiving one or more Interest messages associated with the client stream name, wherein a respective Interest message includes a segment number available to the local network device for sending a data segment to the remote network device; and responsive to obtaining data to send to the remote network device, generating a Content Object with a name from an Interest associated with an available segment number, wherein the Content Object's content includes the data for the remote network device.

18. The storage medium of claim 17, wherein generating the Content Object involves:

obtaining a session key for the bidirectional stream;

encrypting the data for the remote network device to produce an encrypted payload; and generating the Content Object to include the encrypted payload in the Content Object's content.

19. The storage medium of claim 11, wherein the method further comprises:

receiving, from the remote network device, a Content Object that includes a final-block identifier which identifies the Content Object as the final block for the first data stream from the service provider; and responsive to detecting the final-block identifier in the Content Object, closing the first data stream from the remote network device.

20. The storage medium of claim 11, wherein the method further comprises:

responsive to determining that the local network device does not have more data to send to the remote network device, sending a Content Object with a name from an Interest associated with an available segment number, wherein the Content Object's content includes a final-block identifier that identifies the Content Object as the final block for the second data stream to the service provider.

* * * * *